US008622585B2

(12) United States Patent
Scordino et al.

(10) Patent No.: US 8,622,585 B2
(45) Date of Patent: Jan. 7, 2014

(54) LIGHTING DEVICE WITH MULTIPLE LIGHT SOURCES AND PRIMARY AND SECONDARY OPTICS

(75) Inventors: Alessandro Scordino, Mestre (IT); Alessandro Brieda, Sacile (IT); Giovanni Scilla, Fontane di Villorba (IT)

(73) Assignee: Osram Gesellschaft mit beschraenkter Haftung, Munich (DE)

( * ) Notice: Subject to any disclaimer, the term of this patent is extended or adjusted under 35 U.S.C. 154(b) by 477 days.

(21) Appl. No.: 12/129,762

(22) Filed: May 30, 2008

(65) Prior Publication Data

US 2008/0298057 A1 Dec. 4, 2008

(30) Foreign Application Priority Data

May 30, 2007 (EP) .................................... 07010692

(51) Int. Cl.
*F21V 3/00* (2006.01)
*F21V 5/00* (2006.01)
(52) U.S. Cl.
USPC . 362/311.02; 362/238; 362/245; 362/249.02; 362/327; 362/337; 362/800
(58) Field of Classification Search
USPC ................................ 362/235–238, 244–247, 362/249.01–249.02, 249.06, 296.01, 362/296.06, 296.1, 299–300, 304–305, 362/307–309, 311.02, 311.08, 327–328, 362/336–337, 800
See application file for complete search history.

(56) References Cited

U.S. PATENT DOCUMENTS

| 2,853,599 | A | * | 9/1958 | Kliegl ........................... 362/333 |
| 5,081,637 | A | | 1/1992 | Fan et al. |
| 6,367,949 | B1 | | 4/2002 | Pederson ...................... 362/240 |
| 6,504,650 | B1 | | 1/2003 | Alfrey |
| 2003/0179548 | A1 | | 9/2003 | Becker et al. ................. 361/704 |
| 2004/0222516 | A1 | | 11/2004 | Lin et al. ....................... 257/712 |
| 2005/0174775 | A1 | | 8/2005 | Conner |
| 2006/0098441 | A1 | | 5/2006 | Chou ............................ 362/294 |
| 2006/0291206 | A1 | * | 12/2006 | Angelini et al. .............. 362/244 |

FOREIGN PATENT DOCUMENTS

| EP | 1754997 A1 | 2/2007 |
| WO | 00/36336 | 6/2000 |
| WO | 2005050264 A2 | 6/2005 |
| WO | 2007046923 A1 | 4/2007 |

OTHER PUBLICATIONS

European Search Report; EP 07 01 0691; pp. 2, Nov. 7, 2007.
Office Action dated Aug. 21, 2009 of European priority application No. 07 010 692.7.

* cited by examiner

*Primary Examiner* — Jason Moon Han

(57) ABSTRACT

A lighting device has multiple light sources each having a primary optics; and a secondary optics for the multiple light sources; such that at the secondary optics the radiation patterns emitted from the multiple light sources have a substantially uniform luminance; and such that the secondary optics transforms the radiation pattern from the multiple light sources into an elliptical spot of light of substantially uniform luminance.

17 Claims, 7 Drawing Sheets

LIGHTING DEVICE WITH MULTIPLE LIGHT SOURCES AND PRIMARY AND SECONDARY OPTICS

CROSS-REFERENCE TO RELATED APPLICATIONS

This application claims priority to European Patent Application Number 07010692.7 filed on May 30, 2007. The contents of this application is incorporated herein in its entirety by this reference.

TECHNICAL FIELD

The invention relates to a lighting device and a method for manufacturing a lighting device.

BACKGROUND

Currently, multi-chip high-power/high-flux LED light sources are commonly coupled to optical structures like simple reflectors, standard optics, various lens arrays, or diffusive structures. These solutions offer limited performances in terms of efficiency, homogeneity of the resulting beam of light, and compactness.

SUMMARY

According to an embodiment, a lighting device, comprises multiple light sources each comprising a primary optics; and a secondary optics for the multiple light sources; wherein at the secondary optics the radiation patterns emitted from the multiple light sources have a substantially uniform luminance; and wherein the secondary optics transforms the radiation pattern from the multiple light sources into an elliptical spot of light of substantially uniform luminance.

According to a further embodiment, the multiple light sources can be located in an angular symmetry around an optical axis of the lighting device. According to a further embodiment, at the secondary optics the radiation patterns emitted from the multiple light sources may be completely overlapping. According to a further embodiment, the number of light sources can be three or a multiple of three. According to a further embodiment, three light sources can be located at a centre of a respective side of a equilateral triangle. According to a further embodiment, the light sources may have an elongated shape with the longitudinal axis parallel to or coinciding with the respective side of the triangle. According to a further embodiment, the primary optics may comprises a collimator. According to a further embodiment, the secondary optics may comprise a Fresnel structure. According to a further embodiment, the Fresnel structure may comprise a pillow structure within the area surrounded by Fresnel rings.

According to another embodiment, a method for manufacturing a lighting device may comprise the steps of:
defining a shape of the primary optics, comprising the steps of:
comparing a radiation pattern of a single light source to a respective required radiation pattern;
calculating a desired distance of the light source from an optical axis of the lighting device; and
determining a satisfactory overlap of the radiation patterns of the single light sources; and
defining a shape of the secondary optics comprising:
calculating a minimal diameter of Fresnel rings, a number of Fresnel rings, and a geometry finalisation of a Fresnel structure;
defining a shape of a pillow structure of the secondary optics;
comparing a final radiation pattern with a desired radiation pattern.

BRIEF DESCRIPTION OF THE DRAWINGS

The invention is schematically described in more detail in the following embodiments. Same or similar components are denotes by same reference signs, where applicable. This more detailed exemplary description is by no means intended to limit the invention.

DETAILED DESCRIPTION

The lighting device may comprise multiple light sources each comprising a primary optics; and a secondary optics for the multiple light sources; such that at the secondary optics the radiation pattern emitted from the multiple light sources have a substantially uniform luminance; and such that the secondary optics transforms the radiation pattern from the multiple light sources into an elliptical—including circular—spot of light of substantially uniform luminance.

The number of light sources is not limited. Every suitable light source can be used, like an incandescent light bulb, a light emitting diode or a laser diode. The use of LEDs may be preferred. The primary optics can comprise a single optical element or multiple optical elements. Optical elements may be every element that is designed to alter the light emitted from the light source, e.g., including lenses, collimators, lightwave guides etc. The secondary optics can comprise a single optical element or multiple optical elements, or combinations thereof. An optical element may be any element that is designed to modify the light emitted from the light source, e.g., including Fresnel lenses, pillow structures, or combinations thereof.

Advantageously, the multiple light sources may be located in an angular symmetry around the optical axis of the lighting device.

Advantageously, at the secondary optics the radiation patterns emitted from the multiple light sources can be completely overlapping.

Advantageously, the number of light sources may be three or a multiple of three.

Advantageously, three light sources may be located at a centre of a respective side of an equilateral triangle.

Advantageously, the light sources may have an elongated (oblong) shape with the main longitudinal axis parallel to or coinciding with the respective side of the triangle. The shape may be rectangular or elliptic, for example.

Advantageously, the primary optics may comprise a collimator. Advantageously, the secondary optics may comprise a Fresnel structure.

Advantageously, the Fresnel structure may comprise a pillow structure within the area surrounded by the rings.

According to another embodiment, a method for manufacturing the lighting device may comprise at least the following steps: defining a shape of the primary optics, comprising: comparing a radiation pattern of a single light source to a respective required radiation pattern; calculating a desired distance of the light source from an optical axis of the lighting device; and determining a satisfactory overlap of the radiation pattern of the single light sources; and the steps of: defining a shape of the secondary optics comprising: calculating a minimal diameter of Fresnel rings, a number of rings, and a geometry finalisation of a Fresnel structure; defining a shape of a pillow structure of the secondary optics; and comparing a final radiation pattern with a desired radiation pattern.

Figure 1:
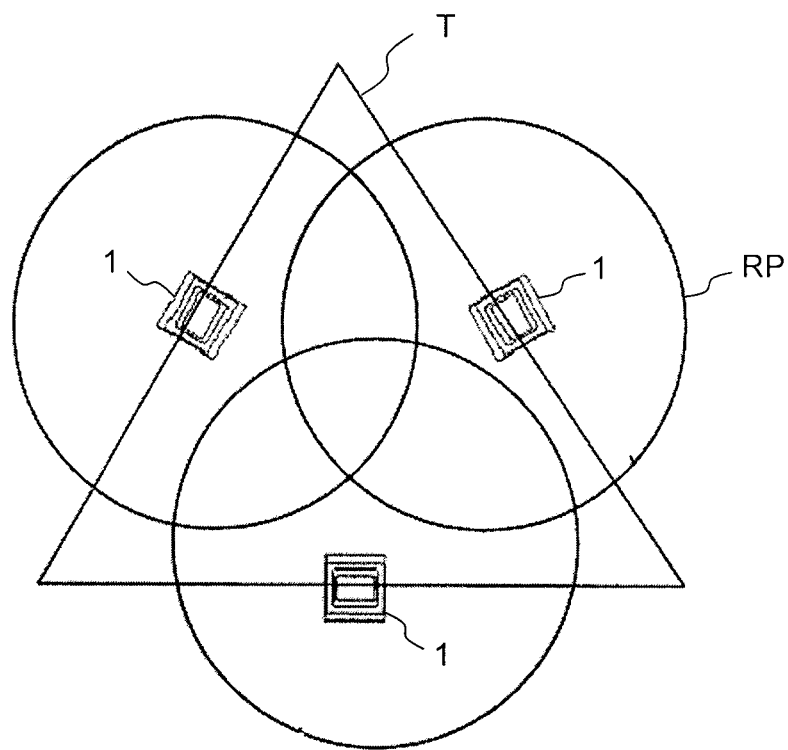
FIG. 1 shows a positioning of light sources of a lighting device according to an embodiment in a top-down view.

FIG. 1 shows the positions of three light emitting diodes (LEDs) 1 as light sources. The LEDs 1 are located at respective centres of an equilateral triangle T. In the case shown the LEDs 1 are of rectangular form with the longer sides placed parallel to the respective side of the triangle T. This also represents an arrangement of the LEDs 1 having an angular three-fold symmetry (120°) around the centre of the triangle T. This positional arrangement creates a multi-polar radiation pattern from a completely overlapping superposition of the single LED radiation patterns RP. The overall radiation pattern thus has no discontinuities in it.

Figure 2:
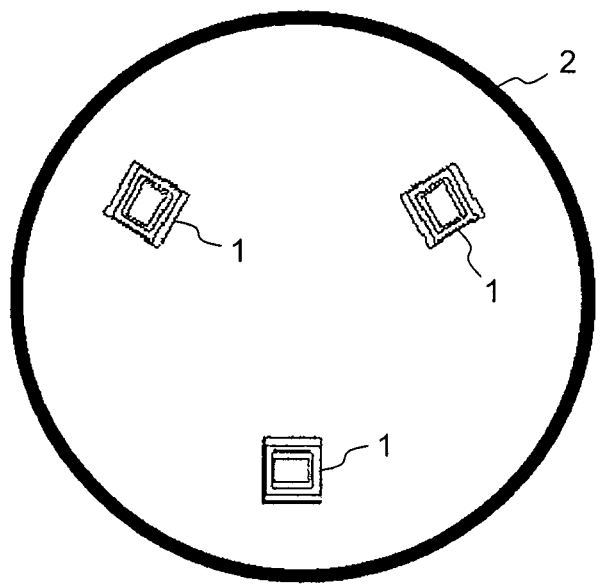
FIG. 2 shows the light sources of FIG. 1 with an additional secondary optics in a top-down view.

FIG. 2 shows the three LEDs 1 of FIG. 1 that are now assumed to be equipped with a respective primary optics (e.g., a collimator, not shown) which shapes the light emitted from the respective LED 1. Covering the LEDs 1 is a secondary optics in form of a Fresnel structure 2 is shown. The secondary optics 2 is acting upon the radiation patterns of all three LEDs 1. While the primary optics and the particular position of the LEDs 1 lead to a first multi-polar radiation pattern that is uniform in luminance after the primary optics, the secondary optics 2 redirects this light to change the luminance spot coming from the primary optics into a round spot with uniform luminance and uniform Correlated Colour Temperature, CCT. This is achieved because of the complete overlap of the single LED radiation patterns without shadowed areas or colour separation.

Figure 3:
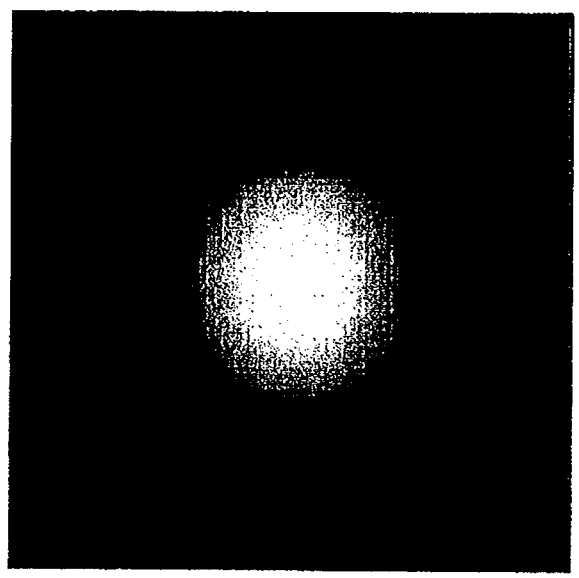
FIG. 3 shows a simulation result of a light spot achieved by the arrangement of FIG. 2 in a top-down view.

FIG. 3 shows a simulation result for the arrangement of FIG. 2 of a light spot after the secondary optics 2.

Figure 4:
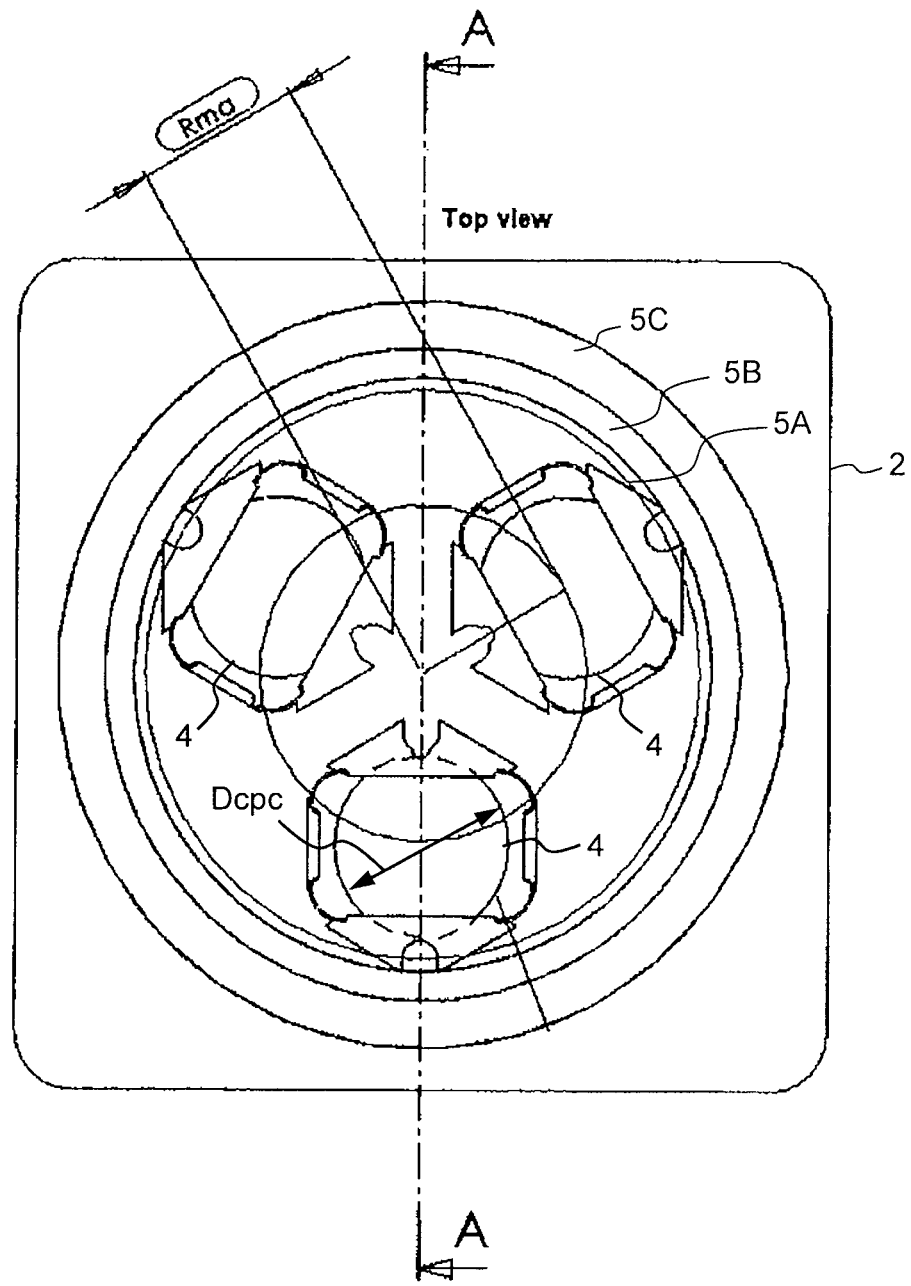
FIG. 4 shows a top-down view on optical layers of the lighting device.

FIG. 4 shows a more detailed top-down view on the optical structure of the lighting device in an illustration basically similar to the one of FIG. 2. Additionally to the arrangement of FIG. 2, there are now also shown the primary optics 4. The primary optics includes a rotationally symmetric collimator body 4 that exhibits a respective maximum diameter Dcpc. Also in more detail are shown three Fresnel rings 5A, 5B, 5C of the Fresnel structure 2, namely an inner Fresnel ring 5A, an intermediary Fresnel ring 5B and an outer Fresnel ring 5C. Rma denotes a distance from the optical axis (centre of symmetry) to the centre of the emitting area of a single LED that in this case coincides with the centre of the collimator 4. This value must be constant and depends on the number of light sources. Rma preferably is a multiple of the source emitting diameter Dcpc, particularly a double or triple value.

Figure 5:
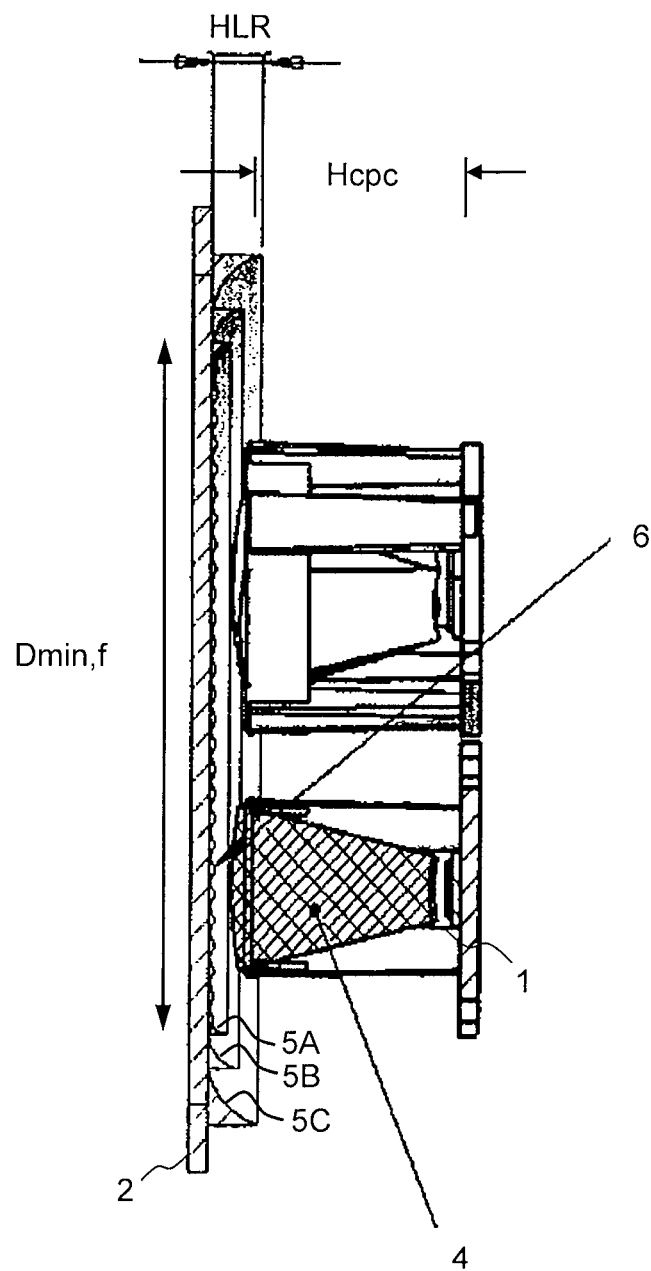
FIG. 5 shows the optics layers of FIG. 4 in a cross-sectional side view along the line A-A of FIG. 5.

FIG. 5 shows the optical layers of FIG. 4 in a cross-sectional side view along line A-A of FIG. 5. The primary optical layer comprises (from right to left) a substrate 5, on which the LEDs 1 are mounted. For the sake of clarity, electrical connections etc are not shown. Mounted on top of the LEDs 1 (to the left in FIG. 6) is a respective collimator 4 that has a truncated conical body with a spherical top section. The shape of the primary Compound Parabolic Concentrator, CPC, collimator 4 helps to increase the spot overlap and overlap of the radiation patterns, resp., after the primary collimation.

The primary optics 4 are covered by a secondary optics layer 2 in form of the Fresnel structure 2. The Fresnel structure 2 shows the three Fresnel rings 5A, 5B, 5C having different heights with HLR denoting the height of the outermost Fresnel ring 5C. The diameter of the innermost Fresnel ring (central area) is denoted by Dmin,f. The Fresnel structure 2 with its predefined number (here: n=3) and height of these reflective prisms (rings) 5A, 5B, 5C is able to redirect the light lost from the primary optics 1, 4 in order to achieve the specified radiation pattern.

Located within these rings 5A, 5B, 5C (central area) is a pillow structure 6 that faces the primary optics layer 1, 4. The pillow structure 6 optimizes the light spot's uniformity and avoids a colour separation.

Figure 6:
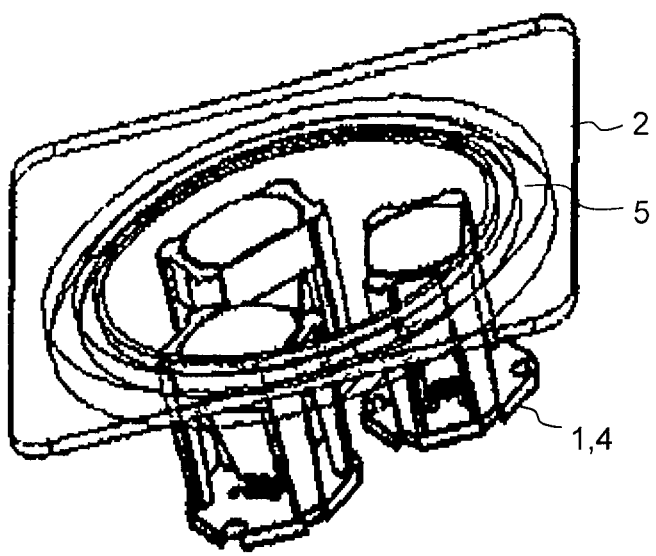
FIG. 6 shows the optics layers of the lighting device in a perspective view.

FIG. 6 shows the LEDs 1 with their primary optics 4 and the Fresnel structure 2 with its Fresnel rings 5 in a perspective view.

Figure 7:
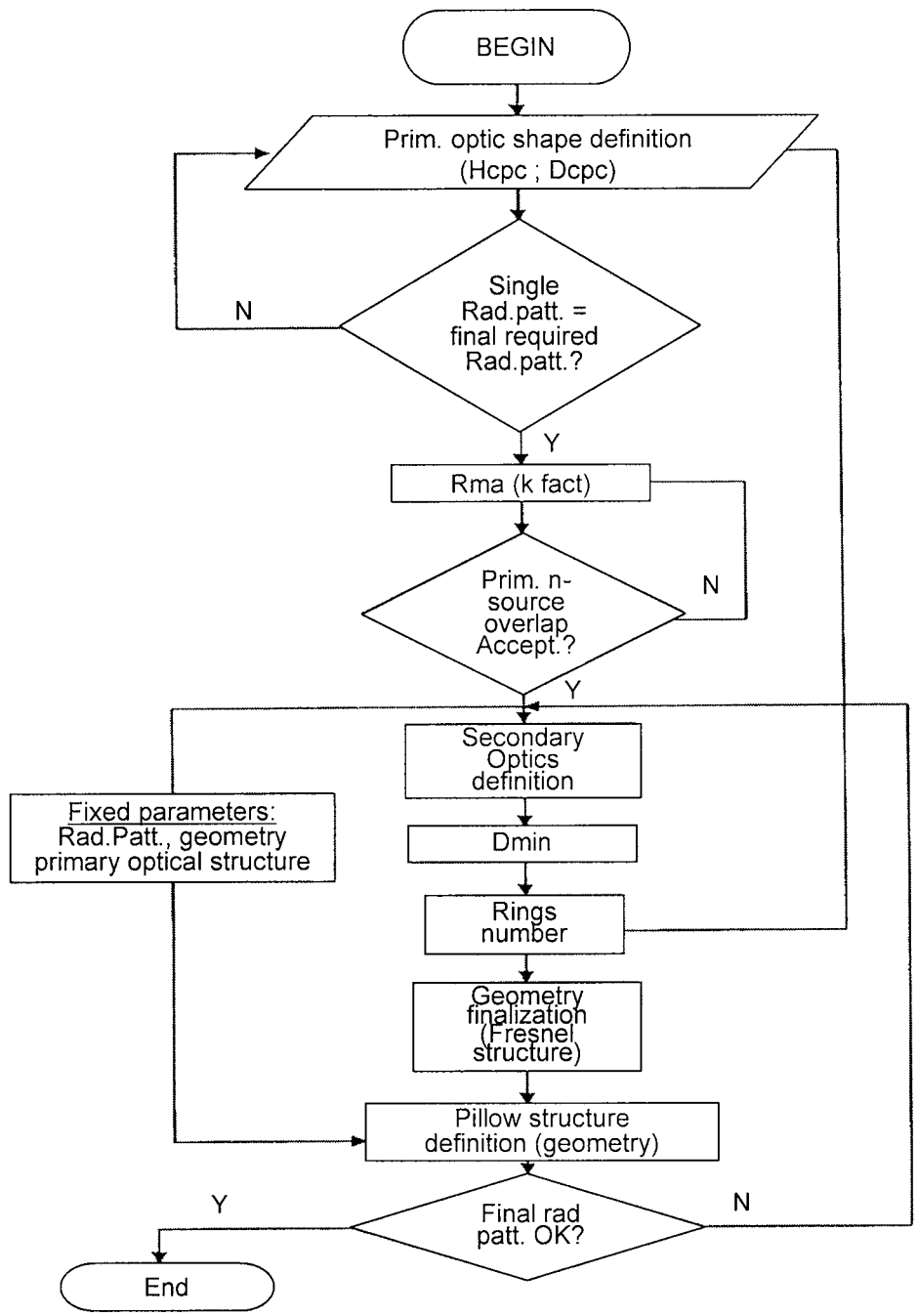
FIG. 7 shows a flow chart describing a process of designing a lighting device according to an embodiment.

The relation and setting of the shown parameters will now be explained in more detail with respect to FIG. 7. For the sake of this example it is assumed that a certain number of CPC collimators placed in a correct location/mode are to be combined with one additional optical structure that includes a prismatic Fresnel ring and a certain remixing pillow structure, as, for example, shown in FIG. 6.

At first, an external dimension/shape of the primary optics is to be set. This is related to the value of a necessary etendue chosen to obtain a required radiation pattern. From the dimension/shape of the primary optics/lens follows the height Hcpc and the diameter of the primary collimator Dcpc that are both functions of the etendue. If this shape achieves the desired primary optics radiation pattern, the next step is it to define the distance Rma by taking into consideration Dcpc and the number of LED sources.

$$Rma = \frac{Dcpc}{k} \quad k(0...3) \sim n_S = (2...9)$$

wherein k is a non dimensional factor of non-mechanical interference between primary optics and $n_s$ is a number of light sources. k is proportional to $n_s$. Rma gives the equidistance between sources. If the primary overlap of radiation patterns of the light sources is acceptable (e.g. no central areas of zero luminance, symmetry of the periphery/or of the external spot [not too elliptic] etc.) then the secondary optics is to be set/defined.

In this case, the secondary optics, that is located above the primary optics, consists of prismatic Fresnel rings and a pillow structure in the central area of it. The prismatic structure may then be designed as follows:

a) A minimum diameter Dmin,f is determined with a value so as not to interfere with correct light rays that create the required radiation pattern according to, e.g., Dmin,f=Rma+0.5Dcpc.

b) The number of prismatic rings nring depends on the primary optical loss or scattering effect and/or the non-interference between entrance optical surface and the LED source. This number is low for high efficient primary optics or high for low efficient primary optics and in this case, e.g., set to 2≤nring≤9.

c) A maximum height of the outermost ring HLR depends on the light rays not collimated and may in this case, for example, be in the range of about 0.5-5 mm.
d) A defined structure of pillows in the centre of the secondary optic/Fresnel structure is able to avoid colour separation or trip imaging. This factor should be optimized regarding pillow shape, diameter, height and distance to the primary optics.

If the resulting radiation pattern sufficiently resembles the desired radiation pattern, the design of the prismatic structure is finished.

Turning now to an even more concrete example, it is assumed that the number of LED light sources is 3, that the required radiation pattern needs a full angle of 38° and that a spot uniformity is required, i.e., that there are no holes of luminance or colour separation after the secondary optics.

The dimension/optical shape for each single primary optic may be such that the height Hcpc may be in the range between 15 and 25 mm, especially about 20 mm, and the maximum diameter of the primary collimator Dcpc may also be in the range between 15 and 25 mm, especially about 21 mm. Due to the low number of light sources, one may take a low value of k. Therefore, Rma is:

$$R_{ma} = \frac{E_{cpc}}{k} = \frac{21}{1.4} = 15 \text{ mm}$$

Now the secondary optics will be defined, starting from calculating the minimum diameter Dmin,f, namely $$D_{minf} = R_{ma} + 0.5 D_{epc} = 15 + 0.5(21) = 25.5 \text{ mm}$$

The number of prismatic/Fresnel rings may be 3 due to an assumed high efficiency of the primary optical structure, i.e., nring=3. The height of the last ring HLR should be in the range of 1 to 2 mm because the primary collimation caused by the collimator is assumed to be good. It follows that the pillow structure in the centre area of the secondary optics/Fresnel structure should be within the range of these values, e.g., such that a single pillow has the form of an ellipsoid with an hexagonal base of 1 mm and a height of about 0.5-1 mm, and a distance from the primary optics/collimator lens to a pillow being in the range of about 0.5-1.5 mm. If the primary optical system, including the LEDs and the collimator, exhibits a relatively large colour separation, the shape of the single pillow may be smaller and higher, for example.

A lighting device using an optical system as shown in FIGS. 1 to 6 provides inter alia the following advantages:
 Excellent white colour mixing with homogeneity and brightness and in CIE x-y colour coordinates (no colour separation);
 Compensation of characteristics of different light sources used in the same structure;
 A radiation pattern can be designed according to specification;
 High efficiency (only 18% loss or less);
 Compact configuration;
 No multiple shadows are created after a certain relatively small distance from the secondary optics (e.g., 1 meter);
 Precisely defined radiation pattern;
 High tolerance against slight differences of white binning selection of the LED sources; and
 High tolerance against a non-circularity of the emitting area.

Figure 8:
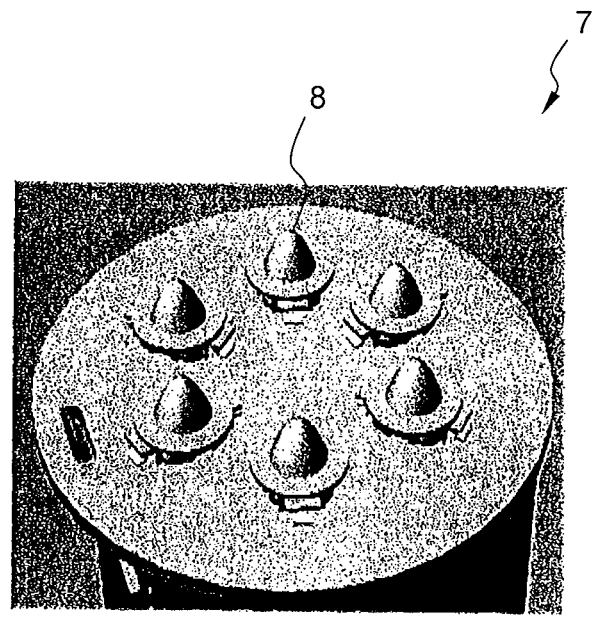
FIG. 8 shows a perspective side view on another embodiment of a lighting device.
Figure 9:
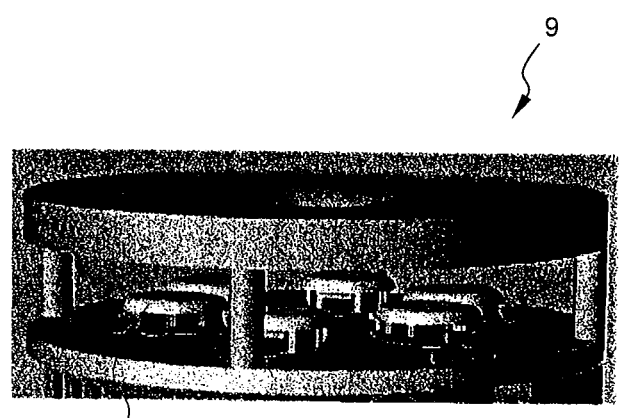
FIG. 9 shows a perspective side view on even another embodiment of a lighting device.

FIGS. 8 and 9 show different embodiments of a lighting system 7, 9, of which mainly the optics layers are shown. FIG. 8 shows six collimators 8 in an angular symmetry around the optical axis, and FIG. 9 shows six symmetrically arranged primary optics/collimators 10 of a yet different form.

The invention is not limited to the above shown and described embodiments but is only limited by the claims. For example, instead of light emitting diodes, light emitting lasers can be used. Also, the shape of the primary optics may be different and may comprise different and more functions. Further the secondary structure may be different from a Fresnel structure and may not contain a pillow structure, or may comprise more or less then three Fresnel rings.

List of Reference Numbers

| | |
|---|---|
| 1 | LED |
| 2 | Fresnel structure |
| 3 | |
| 4 | collimator |
| 5 | Fresnel ring |
| 6 | pillow structure |
| 7 | lighting system |
| 8 | collimator |
| 9 | lighting system |
| 10 | collimator |
| Dcpc | maximum diameter of the collimator |
| Dmin, f | minimum diameter of the Fresnel rings |
| Hcpc | collimator height |
| HLR | height of an outermost Fresnel ring |
| k | interference factor |
| nring | number of Fresnel rings |
| RP | radiation pattern |
| Rma | distance |
| T | equilateral triangle |

What is claimed is:

1. A lighting device, comprising;
 multiple light sources each comprising a primary optics; and
 a common secondary optics for the multiple light sources;
 wherein at the secondary optics radiation patterns emitted from the multiple light sources have a substantially uniform luminance;
 wherein the secondary optics transforms the radiation patterns from the multiple light sources into one elliptical spot of light of substantially uniform luminance;
 wherein the secondary optics comprises a Fresnel structure showing a predefined number of Fresnel rings, wherein the Fresnel rings surround an area free of the Fresnel rings, and wherein the area free of the Fresnel rings overlaps the multiple light sources,
 wherein the secondary optics comprises a pillow structure within the area surrounded by the Fresnel rings,
 wherein a single pillow of the pillow structure has a form of an ellipsoid.

2. The lighting device according to claim 1, wherein the multiple light sources are located in an angular symmetry around an optical axis of the lighting device.

3. The lighting device according to claim 1, wherein at the secondary optics the radiation patterns emitted from the multiple light sources are completely overlapping.

4. The lighting device according to claim 1, wherein the number of light sources is three or a multiple of three.

5. The lighting device according to claim 1, wherein the light sources have a rectangular and/or elliptical shape with the longitudinal axis of the respective light sources being parallel to the respective side of the triangle.

6. The lighting device according to claim 1, wherein the primary optics comprises a rotationally symmetric Compound Parabolic Concentrator as a collimator having a truncated conical body with one spherical top section.

7. The lighting device according to claim 6, wherein a height of the collimator is between 15 mm and 25 mm.

8. The lighting device according to claim 1, wherein a distance of a light source from an optical axis of the lighting device is a multiple of a source emitting diameter.

9. The lighting device according to claim 8, wherein the distance is 15 mm.

10. The lighting device according to claim 1, the Fresnel structure showing a predefined number of Fresnel rings of different heights.

11. The lighting device according to claim 10, wherein a diameter of an inneriuost Fresnel ring is sized according to $D_{min,f} = R_{ma} + 0.5 D_{cpc}$, with $R_{ma}$ being a distance of a light source from an optical axis of the lighting device and $D_{cpc}$ being a source emitting diameter.

12. The lighting device according to claim 10, wherein the height of the Fresnel rings decreases with decreasing diameter of the Fresnel rings.

13. The lighting device according to claim 10, the number of Fresnel rings of different heights being between 2 and 9, a maximum height of an outermost ring being in the range of 0.5 mm to 5 mm.

14. The lighting device according to claim 1, wherein the single pillow of the pillow structure has the form of an ellipsoid with a hexagonal base of 1 mm and a height of about 0.5 mm to 1 mm.

15. The lighting device according to claim 14, wherein a distance from the primary optics to a pillow is in the range of about 0.5 mm to 1.5 mm.

16. The lighting device according to claim 1, wherein three light sources are located at a center of a respective side of an equilateral triangle.

17. The lighting device according to claim 1, wherein the light sources have an elongated shape with a longitudinal axis of the light sources being parallel to the respective side of the triangle.

* * * * *

UNITED STATES PATENT AND TRADEMARK OFFICE
CERTIFICATE OF CORRECTION

PATENT NO.         : 8,622,585 B2
APPLICATION NO.    : 12/129762
DATED              : January 7, 2014
INVENTOR(S)        : Alessandro Scordino et al.

Page 1 of 1

It is certified that error appears in the above-identified patent and that said Letters Patent is hereby corrected as shown below:

In the Claims

Col. 7, line 12 in claim 11, delete "inneiiuost" and insert -- innermost --.

Signed and Sealed this
Thirtieth Day of September, 2014

Michelle K. Lee
*Deputy Director of the United States Patent and Trademark Office*